United States Patent [19]

Sato et al.

[11] Patent Number: 5,403,905

[45] Date of Patent: * Apr. 4, 1995

[54] PROCESS FOR PRODUCING POLYVINYL ESTER HAVING A HIGH DEGREE OF POLYMERIZATION AND PROCESS FOR PRODUCING POLYVINYL ALCOHOL HAVING A HIGH DEGREE OF POLYMERIZATION

[75] Inventors: Toshiaki Sato, Kurashiki; Ken Yuki, Osaka; Junnosuke Yamauchi, Osaka; Takuji Okaya, Osaka, all of Japan

[73] Assignee: Kuraray Company, Ltd., Kurashiki, Japan

[ * ] Notice: The portion of the term of this patent subsequent to Apr. 4, 2006 has been disclaimed.

[21] Appl. No.: 191,185

[22] Filed: Feb. 3, 1994

Related U.S. Application Data

[60] Division of Ser. No. 82,162, Jun. 28, 1993, Pat. No. 5,310,790, which is a continuation of Ser. No. 633,199, Dec. 31, 1990, abandoned, which is a continuation of Ser. No. 277,123, Nov. 29, 1988, abandoned, which is a continuation-in-part of Ser. No. 79,000, Jul. 29, 1987, Pat. No. 4,818,788.

[30] Foreign Application Priority Data

Aug. 1, 1986 [JP] Japan ................................ 61-182097

[51] Int. Cl.$^6$ ................................................ C08F 2/30
[52] U.S. Cl. ...................................... 526/210; 526/212; 526/227; 526/228; 526/230; 526/319; 526/330
[58] Field of Search ................ 526/319, 210, 212, 227, 526/228, 230, 330

[56] References Cited

U.S. PATENT DOCUMENTS

| | | | |
|---|---|---|---|
| 2,860,124 | 11/1958 | Starck et al. | 526/319 |
| 3,105,065 | 9/1963 | Fujii et al. | 526/319 |
| 3,109,833 | 11/1963 | Lockheed et al. | 526/319 |
| 3,162,626 | 12/1964 | Smidt et al. | 526/319 |
| 3,200,104 | 8/1965 | Imai et al. | 526/319 |
| 3,223,328 | 12/1965 | LaCombe et al. | 526/319 |
| 3,303,174 | 2/1967 | Lanthier | 526/319 |
| 3,484,811 | 12/1969 | Levine | 526/319 |
| 3,551,396 | 12/1970 | Lanthier | 526/319 |
| 3,779,992 | 12/1973 | Liu et al. | 526/319 |
| 3,860,568 | 1/1974 | Chabert et al. | 526/319 |
| 4,323,666 | 4/1982 | Shirinian et al. | 526/319 |
| 4,549,002 | 10/1985 | Hoefer et al. | 526/319 |
| 4,818,787 | 4/1989 | Sato et al. | 525/62 |
| 4,818,788 | 4/1989 | Sato et al. | 525/62 |

FOREIGN PATENT DOCUMENTS

| | | |
|---|---|---|
| 0601191 | 4/1948 | United Kingdom . |
| 0814067 | 5/1959 | United Kingdom . |
| 0927893 | 6/1963 | United Kingdom . |
| 0939483 | 10/1963 | United Kingdom . |
| 1012361 | 12/1965 | United Kingdom . |
| 1077956 | 8/1967 | United Kingdom . |

*Primary Examiner*—Romulo H. Delmendo
*Attorney, Agent, or Firm*—Oblon, Spivak, McClelland, Maier & Neustadt

[57] ABSTRACT

Process for producing polyvinyl ester having a high degree of polymerization and an intrinsic viscosity of from 15 dl g$^{-1}$ to 3.2 dl g$^{-1}$, and a polyvinyl ester obtained thereby. The process comprises subjecting a vinyl ester monomer to emulsion polymerization using nonionic emulsifiers nonionic-anionic emulsifiers, or anionic emulsifiers and a redox initiator at a temperature of −60° to 15° C.

16 Claims, No Drawings

PROCESS FOR PRODUCING POLYVINYL ESTER HAVING A HIGH DEGREE OF POLYMERIZATION AND PROCESS FOR PRODUCING POLYVINYL ALCOHOL HAVING A HIGH DEGREE OF POLYMERIZATION

This application is a division of application Ser. No. 08/082,162, filed Jun. 28, 1993, now U.S. Pat. No. 5,310,790, which is a continuation of application Ser. No. 07/633,199 filed Dec. 31, 1990, now abandoned, which is a continuation of application Ser. No. 07/277,123, filed Nov. 29, 1988, now abandoned, which is a CIP of application Ser. No. 07/079,000, filed Jul. 29, 1987, now U.S. Pat. No. 4,818,788.

BACKGROUND OF THE INVENTION

1. Field of the Invention

The present invention relates to a new process for producing polyvinyl ester having a high degree of polymerization and to a new process for producing polyvinyl alcohol having a high degree of polymerization.

More particularly, the present invention is concerned with a process for producing polyvinyl ester having a high degree of polymerization having an intrinsic viscosity not less than 1.5 dl/g, preferably not less than 2.2 dl/g, and most preferably higher than 3.2 dl/g, said process comprising subjecting vinyl ester monomer to emulsion polymerization under the following conditions (a), (b), (c), and (d).

(a) The medium is water or a mixture of water and (A) specified below;
(b) The emulsifier is at least one member selected from (B), (C), and (D) specified below;
(c) The initiator is a combination of (E) and (F) specified below or a combination of (E), (F), and (G) specified below; and
(d) The polymerization temperature is not less than $-60°$ C. and not more than $15°$ C.

(A): At least one member selected from water-soluble alcohol, glycol, glycerin, or inorganic salts.
(B): Nonionic emulsifier.
(C): Nonionic-anionic emulsifier.
(D): Anionic emulsifier.
(E): At least one member selected from hydroperoxide, peroxide, or peracid ester.
(F): Metal ion capable of transferring one electron.
(G): Reducing substance.

The intrinsic viscosity of the polyvinyl ester is defined by a value measured in acetone at $30°$ C. for polyvinyl acetate obtained by saponification, followed by reacetylation, of the polyvinyl ester.

The present invention relates also to a new process for producing polyvinyl alcohol (abbreviated as PVA hereinafter) having a high degree of polymerization, having an intrinsic viscosity not less than 1.5 dl/g, preferably not less than 2.2 dl/g, and most preferably higher than 3.2 dl/g, said process comprising saponifying in the usual way the polyvinyl ester obtained by emulsion polymerization under the above-mentioned conditions. (The intrinsic viscosity of PVA is defined by a value measured in acetone at $30°$ C. for polyvinyl acetate obtained by reacetylation of the PVA.)

Polyvinyl ester, particularly polyvinyl acetate, finds use as a base polymer of adhesives and paints, and it is also very important as a starting material of PVA. PVA as one of the crystalline water-soluble polymers limited in number is used for paper processing, textile processing, and emulsion stabilization on account of its outstanding interfacial characteristics and mechanical properties. It is known that PVA is important as a raw material of vinylon film and vinylon fiber.

Conventional PVA, however, is limited in the degree of polymerization, with an upper limit of 2000 (and 3000 in the case of special product). This is because the PVA having a high degree of polymerization is hard to handle and poor in processability. The other reason is that it is difficult to produce polyvinyl acetate, as a starting material, having a high degree of polymerization.

The recent rapid innovation in processing technique has made possible the processing of polymers having an extremely high degree of polymerization. Such polymers have characteristic properties which have never been known. This is the case with PVA, too. PVA having a high degree of polymerization is expected to exhibit improved characteristic properties in the conventional application areas and is also expected to find new uses as high tenacity fibers and others.

2. Description of the Prior Art

In general, a polymer having a high degree of polymerization is obtained by polymerization at a low temperature and at a low polymerization rate. This is true of polyvinyl acetate, and several cases have been reported. (For example, A. R. Shultz; J. Am. Chem. Soc. 76 3422 (1954), G. M. Burnett, M. H. George, H. W. Melville; J. Polym. Sci. 16 31 (1955), and M. Matsumoto, Y. Ohyanagi; J. Polym. Sci. 46 148 (1960).)

The conventional processes are based on bulk polymerization in which polymerization solution is too viscous to carry out stirring. Therefore, in bulk polymerization, producing a uniform polymer and removing the heat of polymerization is very difficult. Therefore, the commercial production by bulk polymerization is considered to be almost impossible.

In order to eliminate the drawback of bulk polymerization, the present inventors proposed a new process by suspension polymerization. (Japanese Patent Laid-open No. 148209/1986).

According to the process based on suspension polymerization proposed by the present inventors, the drawbacks of bulk polymerization are solved in most part. But, because in these processes with great chain transfer it is essential to lower the polymerization temperature and to lower the rate of polymerization for increasing the degree of polymerization.

Therefore, these processes are not effective.

By contrast, emulsion polymerization is expected to provide a product having a high degree of polymerization at a comparatively high polymerization rate because it differs from bulk polymerization and suspension polymerization in polymerization mechanism. In addition, it has no trouble in stirring and heat removal which is inevitable to bulk polymerization. Therefore, emulsion polymerization is considered to be one of the effective polymerization processes for the production of polyvinyl ester having a high degree of polymerization and polyvinyl alcohol having a high degree of polymerization.

Canadian Patent No. 663,529 (1963) discloses a process for producing polyvinyl acetate having a high degree of polymerization and polyvinyl alcohol having a high degree of polymerization as a saponified product thereof by emulsion polymerization with $\gamma$ ray irradiation. This process is not necessarily a good process for the production of products having high degree of polymerization for reasons given below.

(1) Polymerization is performed at a temperature substantially not less than 0° C.
(2) The use of γ ray irradiation is liable to cause cleavage and cross-linking of the polymer.
(3) The emulsifier is limited to special ones stable to γ ray irradiation such as stearylamide propyldimethyl-β-hydroxyethyl ammonium dihydrogen phosphate.

In general, the lower limit of polymerization temperature in emulsion polymerization is about 0° C. because the medium (water) freezes, breaking emulsion particles, at a polymerization temperature lower than 0° C. However, as mentioned earlier, it is necessary to perform emulsion polymerization at a low temperature, especially not more than 0° C., in order to obtain polyvinyl ester having a high degree of polymerization and PVA having a high degree of polymerization. Therefore, the process disclosed in the above-mentioned Canadian Patent does not provide polyvinyl ester and polyvinyl alcohol having a sufficiently high degree of polymerization.

SUMMARY OF THE INVENTION

It is an object of the present invention to provide a new process for the commercial production of polyvinyl ester having a high degree of polymerization and PVA having a high degree of polymerization which is a saponification product of said polyvinyl ester.

DESCRIPTION OF THE PREFERRED EMBODIMENTS

The present inventors carried out extensive studies on the commercial production of polyvinyl ester having a high degree of polymerization. As the result, it was found that it is possible to obtain polyvinyl ester having a high degree of polymerization having an intrinsic viscosity not less than 1.5 dl/g, preferably not less than 2.2 dl/g, and most preferably higher than 3.2 dl/g, by subjecting vinyl ester monomer to emulsion polymerization under the following conditions (a), (b), (c), and (d).

(a) The medium is water or a mixture of water and (A) specified below;
(b) The emulsifier is at least one member selected from (B), (C), and (D) specified below;
(c) The initiator is a combination of (E) and (F) specified below or a combination of (E), (F), and (G) specified below; and
(d) The polymerization temperature is not less than −60° C. and not more than 15° C.
(A): At least one member selected from water-soluble alcohol, glycol, glycerin, or inorganic salts.
(B): Nonionic emulsifier.
(C): Nonionic-anionic emulsifier.
(D): Anionic emulsifier.
(E): At least one member selected from hydroperoxide, peroxide, or peracid ester.
(F): Metal ion capable of transferring one electron.
(G): Reducing substance.

The intrinsic viscosity of the polyvinyl ester is defined by a value measured in acetone at 30° C. for polyvinyl acetate obtained by saponification, followed by reacetylation, of the polyvinyl ester.

In addition, it was also found that it is possible to produce PVA having a high degree of polymerization having an intrinsic viscosity not less than 1.5 dl/g, preferably not less than 2.2 dl/g, and most preferably higher than 3.2 dl/g, by saponifying in the usual way the polyvinyl ester obtained by emulsion polymerization of vinyl ester monomer under the above-mentioned conditions (a) to (d). (The intrinsic viscosity of PVA is defined by a value measured in acetone at 30° C. for polyvinyl acetate obtained by reacetylation of the PVA.) The present invention is based on these findings.

The inventors have also found that when a polymerization temperature of −60° C. to +15° C. is used with the process of this invention, the polymer obtained has a high degree of polymerization, an intrinsic viscosity of from 1.5 dl g$^{-1}$ to 3.2 dl g$^{-1}$, and a surprising and advantageous low content of 1,2-glycol bonding in the main polymer chain. These advantageous characteristics are found for both the polyvinyl alcohol and the polyvinyl acetate products provided by the present invention.

In what follows, we will describe in more detail the emulsion polymerization of the invention.

In the first place, the polymerization temperature should preferably be as low as possible from the standpoint of suppressing the chain transfer as mentioned above. However, at an excessively low polymerization temperature, the polymerization rate is low and the polymerization system is easily affected by oxygen because the rate constant of propagation reaction is also low in proportion to the polymerization temperature. Therefore, the polymerization temperature should be in the range of −60° C. to +15° C. preferably −60° C. to +10° C., more preferably −50° C. to 0° C., and most preferably −50° C. to −15° C.

In the case where the polymerization temperature is not more than 0° C., care should be exercised to prevent the aqueous phase from freezing. Therefore, it is essential to add to the aqueous phase a water-soluble alcohol, glycol, glycerin, or inorganic salt (referred to as (A) collectively). Examples of (A) include methanol, ethanol, propanol, t-butanol, ethylene glycol, glycerin, LiCl, NaCl, and KCl. Most preferable among them is methanol from the standpoint of solubility, effect on emulsion stability, post-treatment after polymerization, and saponification into PVA. The amount of (A) required to prevent freezing varies depending on the polymerization temperature. The weight ratio of water to (A) should be 100/0 to 50/50, preferably 90/10 to 60/40.

In the next place, the emulsifier is required to be soluble at −60° C. to 15° C. in water containing (A) at a weight ratio of [water/(A)] to be 100/0 to 50/50. In addition, it should be able to stabilize polymer particles formed, keeping them emulsified. The emulsifiers which meet these requirements are nonionic emulsifiers (B), nonionic-anionic emulsifiers (C), and anionic emulsifiers (D). Cationic emulsifier is not preferable.

Examples of (B) include polyoxyethylene alkyl ether, polyoxyethylene alkylphenyl ether, polyoxyethylene alkyl ester, and polyoxyethylene sorbitan alkyl ester. Examples of (C) include polyoxyethylene alkylphenyl ether sulfate ester and polyoxyethylene alkyl ether phosphate ester. Examples of (D) include sulfate ester of higher alkyl alcohol, alkylaryl sulfonate, and phosphate ester of aliphatic alcohol. (B), (C), and (D) may be used individually or in combination with one another. They are added to vinyl ester monomer in an amount of 0.5 to 50 wt %, preferably 1 to 30 wt %. (B) is most preferable among the three.

Lastly, we will explain the initiator. In the case of polymerization performed at a low temperature as in the present invention, an initiator of thermal decomposition type, which is used for ordinary emulsion polymerization, cannot be used because of too low a decomposition rate. The redox reaction is known to effectively generate radicals even at a low temperature. The redox catalyst is most effective under the above-mentioned conditions for emulsion polymerization in the present invention.

The redox initiator that can be used in the present invention is composed of:

(E) At least one member selected from hydroperoxide, peroxide, or peracid ester;

(F) Metal ion capable of transferring one electron; and (G) Reducing substance.

(E) and (F) are used in combination with each other, or (E), (F), and (G) are used in combination with one another.

Examples of (E) include hydrogen peroxide, cumene hydroperoxide, t-butyl hydroperoxide, persulfate (K, Na, or ammonium salt), t-butyl peracetate, and t-butyl perbenzoate. Examples of (F) include $Fe^{2+}$, $Cr^{2+}$, $V^{2+}$, $Ti^{3+}$, $Co^{2+}$, and $Cu^+$. Examples of (G) include Rongalite and 1-ascorbic acid. Preferred examples of (E) are hydrogen peroxide, persulfate (K, Na, or ammonium salt), and cumene hydroperoxide; a preferred example of (F) is $Fe^{2+}$ and a preferred example of (G) is Rongalite.

It is important that the initiator should be used in such a manner that (F) alone or (F) and (G) in combination are present in sufficient excess compared with (E) during polymerization. Otherwise, (E) remains in the polymerization system after polymerization, and the residual (E) brings about undesirable post-polymerization reaction when the system is heated for post-treatment and other subsequent processes. The result is that the products having a high degree of polymerization intended in the invention are not obtained.

For reasons mentioned above, the reactants (E) (F) and (G) should be added to the polymerization system in such a manner that (F) alone or (F) and (G) in combination are added all at once and (E) is added later and continuously. The ratio of concentrations of (E) (F), and (G) and the method of adding (E) (F), and (G) are important factors that seriously affect the degree of polymerization of polyvinyl ester and PVA.

The low-temperature emulsion polymerization in the present invention is different from the ordinary high-temperature emulsion polymerization. Great care should be exercised against the removal of oxygen from the system before the start of polymerization and the entrance of oxygen into the system during polymerization. This is because the concentration of radical in the system is low and the system is easily affected by oxygen and impurities. Especially, oxygen functions as a strong inhibitor.

For this reason, water and monomer for the emulsion polymerization in the present invention should be completely deoxygenated prior to use. Preferably, water should be deoxygenated by boiling and subsequently stored with the atmosphere replaced with nitrogen or argon having a purity not less than 99.99%, preferably not less than 99.99%, so that the amount of dissolved oxygen should be kept in the order of not more than $10^{-3}$ wt %. The vinyl ester monomer should be purified in the usual way prior to use.

The vinyl ester monomer used in the present invention includes vinyl formate, vinyl acetate, vinyl propionate, vinyl valerate, vinyl caprate, vinyl laurate, and vinyl stearate. Vinyl acetate is preferable for the production of PVA.

The above-mentioned vinyl ester monomer may be copolymerized with a proper copolymerizable monomer. Examples of such copolymerizable monomers include (meth)acrylic acid and ester, itaconic acid and ester, maleic ester, maleic anhydride, (meth)acrylamide or derivatives thereof, vinyl chloride, vinyl fluoride, vinylidene chloride, vinylidene fluoride, acrylonitrile, and vinyl alkoxysilane.

In the emulsion polymerization of the present invention, the conversion to polymer is important because it affects the degree of polymerization. The conversion to polymer is usually 10–90%, preferably 20–80%, and more preferably 30–70%.

The polyvinyl ester emulsion obtained by the emulsion polymerization of the present invention may undergo ordinary coagulation or stripping for the separation and recovery of the polymer. In the case where PVA is a desired product, the emulsion should be dissolved in a large amount of methanol containing an inhibitor and the unreacted vinyl ester (preferably vinyl acetate) should be removed by distillation. The thus obtained methanol solution of polyvinyl ester can undergo alcoholysis into PVA with a catalyst such as $NaOH$, $NaOCH_3$, and $NaOC_2H_5$ although it contains water.

Alcoholysis will be described in more detail. In general, the alcoholysis of polyvinyl esters, especially polyvinyl acetate, is carried out by adding a basic catalyst to a methanol solution of polyvinyl acetate. A solution, permits the catalyst to be distributed uniformly, making it possible to control the rate and degree of saponification and to obtain uniformly saponified PVA. Polyvinyl acetate obtained by suspension polymerization or emulsion polymerization (as in the present invention) in which polymer coagulates and must be separated, has to be dissolved in methanol after separation from the system, washing, and removal of water and unreacted monomer. The methanol solution thus obtained enters the next step of saponification.

In the case of polyvinyl acetate having a high degree of polymerization as in the present invention, dissolution in methanol takes a long time. However, this is not the case with polyvinyl acetate produced by using a homogeneous system such as bulk polymerization and solution polymerization in methanol. In this case a methanol solution of polyvinyl acetate is obtained simply by removing residual monomer. Bulk polymerization and solution polymerization are superior in this respect; however, they have a disadvantage that the polymerization system becomes too viscous to stir and to remove reaction heat, if vinyl acetate having a high degree of polymerization is to be produced or if polymerization is to be performed at a low temperature and at a low rate. Therefore, they cannot provide polyvinyl acetate having a high degree of polymerization and in its turn PVA having a high degree of polymerization. For this reason, suspension polymerization or emulsion polymerization which causes polymer to separate out is desirable for the production of PVA having a high degree of polymerization. Emulsion polymerization is particularly preferable from the standpoint of polymerization rate. Unfortunately, they involve great difficulties described above in the steps after polymerization.

The present inventors carried out extensive studies on the production of PVA having a high degree of polymerization from polyvinyl ester having a high degree of polymerization obtained by the emulsion polymerization of the invention. As the result, it was unexpectedly found that emulsion of polyvinyl ester having a high degree of polymerization having a particle diameter not more than 5 μm can be uniformly dissolved with very mild agitation in methanol in an amount of 2-100 times (by weight), preferably 5-50 times (by weight), that of the polyvinyl ester. (The resulting methanol solution contains water originating from emulsion.) The dissolution takes place in a short time without coagulation of emulsion. This is contrary to the expectation that the emulsion resulting from emulsion polymerization, which is composed of water, polymer, monomer, and stabilizer, is very hard to dissolve in a solvent containing a large quantity of water which is non-solvent to polymer, especially in the case where the polymer has a high degree of polymerization as in the present invention.

The methanol solution, with a basic catalyst added, undergoes saponification in the usual way, after removal of unreacted vinyl ester monomer and water (if necessary). Thus the desired PVA having a high degree of polymerization can be obtained very easily without complex steps. In other words, according to the process of the present invention, the polyvinyl ester having a high degree of polymerization, especially polyvinyl acetate, obtained by the emulsion polymerization of the invention can be converted into PVA having a high degree of polymerization without the conventional process (including the coagulation of emulsion, separation of polymer, and dissolution of polymer) which needs a great deal of time and energy.

In the case where the emulsion of polyvinyl ester has a particle diameter greater than 5 μm, dissolution in methanol takes a long time. Therefore, the particle diameter should preferably be not more than 5 μm, preferably not more than 2 μm, and more preferably not more than 1 μm, particularly in the case where the desired product is PVA having a high degree of polymerization.

If the amount of methanol is less than twice (by weight) that of the polyvinyl ester, the solubility of the polyvinyl ester having a particle diameter not more than 5 μm is poor. Conversely, if the amount of methanol is greater than 100 times (by weight) that of the polyvinyl ester, there is no problem in solubility but the resulting solution has such a low polymer concentration that the subsequent steps are inefficient.

In the case where a water-methanol mixture is used as a medium for emulsion polymerization, the amount of methanol in the medium should be added to the amount of methanol for dissolution.

The substantially uniform methanol solution obtained as mentioned above subsequently undergoes saponification in the usual way after the addition of a basic catalyst. (If the methanol solution contains unreacted vinyl ester monomer in such an amount as to adversely affect the saponification, it may be removed by distillation.) Since the methanol solution contains water originating from emulsion, the saponification in the methanol solution may require more catalyst and forms more salt than the ordinary saponification in the substantially anhydrous state. The catalyst and salt can be washed out if necessary. Washing is easy in the case of PVA having a high degree of polymerization and also a high degree of saponification. It is also possible to perform saponification after distilling away residual water by introducing methanol vapor or by adding a third component for azeotropy.

In the case where the PVA obtained in the present invention is a completely saponified product, it can be washed with cold water to remove impurities such as sodium acetate, emulsifier, and initiator. In addition, washing with an acid aqueous solution is effective for the removal of metal ions.

The present invention is intended to provide a new industrial process for producing polyvinyl ester having a high degree of polymerization having an intrinsic viscosity not less than 1.5 dl/g, preferably not less than 2.2 dl/g, and more preferably higher than 3.2 dl/g, and PVA having a high degree of polymerization having an intrinsic viscosity not less than 1.5 dl/g, preferably not less than 2.2 dl/g, and more preferably higher than 3.2 dl/g by saponification of the abovementioned polyvinyl ester having a high degree of polymerization. (The intrinsic viscosity is defined above.) The object of the present invention is achieved by performing emulsion polymerization of vinyl ester monomer under the following conditions (a) to (d) and subsequently saponifying the thus obtained polyvinyl ester.

(a) The medium is water or a mixture of water and (A) specified below;
(b) The emulsifier is at least one member selected from (B), (C), and (D) specified below;
(c) The initiator is a combination of (E) and (F) specified below or a combination of (E), (F), and (G) specified below; and
(d) The polymerization temperature is not less than −60° C. and not more than 15° C.
  (A): At least one member selected from water-soluble alcohol, glycol, glycerin, or inorganic salts.
  (B): Nonionic emulsifier.
  (C): Nonionic-anionic emulsifier.
  (D): Anionic emulsifier.
  (E): At least one member selected from the hydroperoxide, peroxide, or peracid ester.
  (F): Metal ion capable of transferring one electron.
  (G): Reducing substance.

One of the most distinctive features of the present invention is emulsion polymerization that is performed at a low temperature in the range of −60° C. to +15° C., preferably −60° C. to +10° C., more preferably −50° C. to 0° C., and most preferably −50° C. to −15° C. Because of this feature, the present invention provides a polyvinyl ester having a high degree of polymerization and PVA having a high degree of polymerization without any engineering problems such as stirring and heat removal which otherwise occur during polymerization. Moreover, the emulsion polymerization of the present invention provides the polyvinyl ester much faster than conventional bulk polymerization and suspension polymerization. According to the present invention, the conversion from polyvinyl ester to PVA can be achieved very easily as mentioned above.

The polyvinyl ester having a high degree of polymerization obtained as mentioned above will find use as, sheets and films because of its high strength. In addition, the polyvinyl ester having a high degree of polymerization can be saponified in the usual way to give PVA having a high degree of polymerization, which will find use as high-strength PVA-sheet or fiber.

To further illustrate the invention, and not by way of limitation, the following examples are given. In the examples "%" and "parts" mean "wt %" and "parts by weight", respectively.

EXAMPLES

Example 1

In a reactor equipped with a stirrer, thermometer, nitrogen inlet, and cooling pipe was placed 300 parts of deionized water. The water was boiled for 30 minutes and then cooled to room temperature while introducing nitrogen. In the water under a nitrogen stream were dissolved with stirring 12 parts of polyoxyethylene [POE(40)] nonylphenyl ether ("Nonipol 400" a product of Sanyo Chemical Industries, Ltd.), 0.05 parts of $FeSO_4.7H_2O$, and 0.50 parts of Rongalite. After dissolution, a mixture composed of 300 parts of vinyl acetate (which had separately been deaerated at 60° C. under a nitrogen stream) and 100 parts of methanol (which also had separately been deaerated at 60° C. under a nitrogen stream) was added to the reactor. The reactants were stirred at room temperature for 30 minutes. Then the internal temperature was lowered to −20° C. under a nitrogen stream, and the polymerization was initiated by continuously adding 0.03% hydrogen peroxide at a rate of 12 parts per hour. (The hydrogen peroxide solution was separately prepared form deaerated deionized water.) During polymerization, the system was sealed with nitrogen gas to prevent the entrance of oxygen. Two hours later when the conversion to polymer reached 48% (the maximum rate of polymerization=25%/hr), the emulsion (having an average particle diameter of 0.08 μm) in the reactor was dissolved with stirring in 3000 parts of methanol containing 0.5 parts of hydroquinone monomethyl ether. After dissolution, unreacted vinyl monomer was removed while adding methanol under reduced pressure. Thus there was obtained a methanol solution of polyvinyl acetate. A portion of the solution was saponified at a PVAc concentration of 6%, at an [NaOH]/[VAc] molar ratio of 0.1, and at 40° C. 0.1 Parts of the resulting polyvinyl alcohol (PVA) was reacetylated with occasional stirring in a mixed liquid composed of 8 parts of acetic anhydride and 2 parts of pyridine at 105° C. for 20 hours. The resulting polyvinyl acetate was purified by repeated reprecipitation with ether from an acetone solution and with water from an acetone solution. The intrinsic viscosity of the purified polyvinyl acetate was measured in acetone at 30° C. according to the dilution method using an Ubbellohde viscometer; $[\eta]=3.62$ (dl/g).

The methanol solution of polyvinyl acetate was saponified as a PVAC concentration of 6%, at an [NaOH]/[VAc] molar ratio of 0.1, and at 40° C. After removal of solution, the resulting PVA was immersed in methanol containing the same amount of NaOH as used for saponification. Resaponification was performed at 40° C. for 24 hours. The residual NaOH in PVA was neutralized with 1N sulfuric acid and the resulting PVA was washed with 0.0001N sulfuric acid and then washed repeatedly with deionized water and finally washed with methanol. After removal of methanol, the purified PVA was dried at 60° C. The purified PVA was found to have a degree of saponification of 99.5%. This PVA was reacetylated under the same conditions as mentioned above and the resulting polyvinyl acetate was purified by reprecipitation in the same manner as mentioned above. The intrinsic viscosity of the purified polyvinyl acetate was measured in acetone at 30° C.; $[\eta]=3.62$ (dl/g).

Comparative Example 1

In a reactor equipped with a stirrer, thermometer, nitrogen inlet, and cooling pipe was placed 3000 parts of distilled water and 0.3 parts of PVA-217 (a product of Kuraray Co., Ltd., having a degree of polymerization of 1700 and a degree of saponification of 88 mol %). PVA-217 was dissolved at 90° C. The solution was cooled to 5° C. of the internal temperature in a constant temperature bath while introducing nitrogen. Separately, 0.125 parts of 2,2'-azobis(4-methoxy-2,4-dimethylvaleronitrile) was rapidly dissolved in 1500 parts of vinyl acetate monomer which had been purified in the usual way, followed by replacement with nitrogen at 60° C. and cooling to 5° C. with the introduction of nitrogen. The thus prepared vinyl acetate monomer was added with stirring to the aqueous solution of PVA-217 to initiate polymerization. During polymerization, the system was sealed with nitrogen gas to prevent the entrance of oxygen. The polymerization proceeded at 5° C. and at an initial polymerization rate of 1.0% hour. 95 Hours later, unreacted monomer was removed over 48 hours under reduced pressure at 5° C. The resulting pearl-like polymer was filtered out and washed with water repeatedly, followed by drying under reduced pressure at 30° C. The amount of the dried polymer was 1226 parts.

A portion of the thus obtained polyvinyl acetate was dissolved in methanol. The methanol solution was saponified at a PVAc concentration of 6%, at an [NaOH]/[VAc] molar ratio of 0.05, and at 40° C. 0.1 Parts of the resulting PVA was reacetylated with occasional stirring in a mixed liquid compound of 8 parts of acetic anhydride and 2 parts of pyridine at 105° C. for 20 hours. The resulting polyvinyl acetate was purified by repeated reprecipitation with ether from an acetone solution and with water from an acetone solution. The intrinsic viscosity of the purified polyvinyl acetate was measured in acetone at 30° C. according to the dilution method using an Ubbellohde viscometer; $[\eta]=3.15$ (dl/g).

The above-mentioned polyvinyl acetate was dissolved in methanol and saponified under the same conditions as mentioned above. There was obtained PVA having a degree of saponification of 98.9 mol %. This PVA was reacetylated under the same conditions as mentioned above, followed by purification by repeated reprecipitation as mentioned above. The intrinsic viscosity of the purified polyvinyl acetate was measured in acetone at 30° C.; $[\eta]=3.15$ (dl/g).

It is noted that the maximum rate of polymerization was 25%/hr in the emulsion polymerization shown in Example 1, whereas initial rate of polymerization was 1.0%/hr in suspension polymerization to give a polymer having the same degree of polymerization (although the suspension polymerization has no engineering problems such as stirring and heat removal encountered in bulk polymerization).

Comparative Example 2

In a reactor equipped with a stirrer, thermometer, nitrogen inlet, and cooling pipe was placed 1.08 parts of 2,2'-azobis(4-methoxy-2,4-dimethylvaleronitrile). With the atmosphere replaced with nitrogen, the reactor was cooled in a constant temperature bath at 15° C. 300 Parts of vinyl acetate monomer which had been purified in the usual way, followed by replacement with nitrogen at 60° C. and cooling to 15° C. with the introduction of nitrogen, was added to the reactor to initiate polymerization. During polymerization, the system was sealed with nitrogen gas to prevent the entrance of oxygen. The polymerization proceeded at 15° C. at an initial polymerization rate of 7.5%/hour. However, about 2 hours later, the viscosity increased to make stirring difficult, and 4 hours later, it was impossible to perform stirring and to keep the internal temperature at 15° C.

24 Hours later, the polymer was sampled and the conversion to polymer was measured. It was 79%. Vinyl acetate monomer was removed in the presence of thiourea. Thus there was obtained polyvinyl acetate. A portion of the polyvinyl acetate was saponified in the same manner as in Comparative Example 1 to give PVA. The PVA was reacetylated to give polyvinyl acetate. The intrinsic viscosity of the polyvinyl acetate was measured; $[\eta] = 1.42$ (dl/g).

In this comparative example, the amount of vinyl acetate monomer was one-fifth that in Comparative Example 1. Nevertheless, bulk polymerization in this comparative example could not be carried out because of the rapid viscosity increase which made stirring difficult and made it impossible to keep the internal temperature at 15° C. The conversion to polymer in Comparative Example 2 is almost equal to that in Comparative Example 1; however, the intrinsic viscosity $[\eta]$ of the reacetylated product in Comparative Example 2 is considerably lower than that in Comparative Example 1 (suspension polymerization) and is extremely lower than that in Example 1.

Examples 2 to 7, and 9

The procedure in Example 1 was repeated except that the conditions of polymerization were modified as shown in Table 1-(a). The results are shown in Table 1-(b).

TABLE 1-(a)

| | | | | Polymerization conditions | | | | |
|---|---|---|---|---|---|---|---|---|
| | Water | MeOH | Emulsifier | | Initiator (%, parts) | | | Temperature |
| Example | (Parts) | (Parts) | (parts) | (E) | (F) | (G) | | (°C.) |
| 2 | 300 | 100 | Polyoxyethylene (POE(40)) nonylphenyl ether 12 | $H_2O_2$ 0.03% | $FeSO_4 \cdot 7H_2O$ 0.5 parts | Rongalite 0.5 parts | | −20 |
| 3 | 240 | 160 | Polyoxyethylene (POE(40)) nonylphenyl ether 12 | $H_2O_2$ 0.03% | $FeSO_4 \cdot 7H_2O$ 0.05 parts | Rongalite 0.5 parts | | −20 |
| 4 | 240 | 160 | Polyoxyethylene (POE(40)) nonylphenyl ether 24 | $H_2O_2$ 0.15% | $FeSO_4 \cdot 7H_2O$ 0.05 parts | Rongalite 0.5 parts | | −40 |
| 5 | 240 | 160 | Polyoxyethylene (POE(10)) sulfate ester nonylphenyl ether 6 | $K_2S_2O_8$ 0.5% | $FeSO_4 \cdot 7H_2O$ 0.05 parts | Rongalite 0.5 parts | | −20 |
| 6 | 240 | 160 | Polyoxyethylene (POE(40)) nonylphenyl ether 12 | $H_2O_2$ 0.15% | $FeSO_4 \cdot 7H_2O$ 0.15 parts | — | | −20 |
| 7 | 400 | 0 | Polyoxyethylene (POE(40)) nonylphenyl ether 12 | $H_2O_2$ 0.03% | $FeSO_4 \cdot 7H_2O$ 0.05 parts | Rongalite 0.5 parts | | 5 |
| 9 | 300 | 0 | Polyoxyethylene (POE(50)) nonylphenyl ether 9 | $H_2O_2$ 0.003% | $FeSO_4 \cdot 7H_2O$ 0.009 parts | Rongalite 0.22 parts | | −15 |

TABLE 1-(b)

| | | | Results of Polymerization | | | | | |
|---|---|---|---|---|---|---|---|---|
| | Polymerization time | Conversion to polymer | Maximum rate of polymerization | Polyvinyl ester | Average particle diameter of | Polyvinyl alcohol | | |
| Example | (Parts) | (%) | (%/hr) | $[\eta]$ (dl/g) | polyvinyl ester (μm) | $[\eta]$ (dl/g) | (mol %)*1 | (mol %)*2 |
| 2 | 3.0 | 59.5 | 20.0 | 4.21 | 0.08 | 4.21 | 99.7 | |
| 3 | 3.5 | 59.0 | 17.0 | 3.81 | 0.09 | 3.81 | 99.1 | |
| 4 | 3.5 | 56.8 | 17.0 | 3.30 | 0.09 | 3.30 | 99.2 | |
| 5 | 2.0 | 51.2 | 25.0 | 3.25 | 0.07 | 3.25 | 99.6 | |
| 6 | 2.0 | 37.5 | 19.0 | 3.72 | 0.07 | 3.72 | 99.5 | |
| 7 | 3.5 | 82.0 | 25.0 | 2.90 | 0.07 | 2.90 | 99.8 | ≈1.02 |
| 9 | 2.8 | 62.0 | 18.0 | 2.55 | 0.13 | 2.55 | 99.9 | 1.13 |

*1 Degree of saponification.
*2 Content of 1,2-glycol bonding.

Example 8

In a reactor equipped with a stirrer, thermometer, nitrogen inlet, and cooling pipe was placed 300 parts of deionized water. The water was boiled for 30 minutes and then cooled to room temperature while introducing nitrogen. In the water under a nitrogen stream were dissolved with stirring 12 parts of polyoxyethylene [POE(40)] nonylphenyl ether ("Nonipol 400" a produce of Sanyo Chemical Industries, Ltd.), 0.05 parts of FeSO$_4$.7H$_2$O, and 0.50 parts of Rongalite. After dissolution, a mixture composed of 300 parts of vinyl acetate (which had separately been deaerated at 60° C. under a nitrogen stream) and 100 parts of methanol (which also had separately been deaerated at 60° C., under a nitrogen stream) was added to the reactor. The reactants were stirred at room temperature for 30 minutes. Then the internal temperature was lowered to −20 C. under a nitrogen stream, and the polymerization was initiated by continuously adding 0.03% hydrogen peroxide at a rate of 12 parts per hour. (The hydrogen peroxide solution was separately prepared from deaerated deionized water.) During polymerization, the system was sealed with nitrogen gas to prevent the entrance of oxygen. Two hours later when the conversion to polymer reached 48%, the addition of hydrogen peroxide solution was suspended and 1.0 part of hydroquinone monomethyl ether was added to stop polymerization.

The resulting emulsion (having an average particle diameter of 0.2 μm) was divided into three equal parts A(Test Run 1), B(Test Run 2), and C(Test Run 3), which were intended to be converted into PVA according to the following manner.

A: (Test Run 1)

sample A was slowly added with stirring at room temperature to 1000 parts of methanol containing 0.5 parts of hydroquinone monomethyl ether. (The ratio of methanol to polymer is 21.5.) It took about 2 hours for the solution to become substantially uniform.

After that, unreacted vinyl acetate was expelled under reduced pressure while adding methanol. Thus there was obtained a methanol solution (containing water) of polyvinyl acetate. (Polymer concentration=7.1%)

B: (Test Run 2)

Sample B was slowly added with stirring at room temperature to 50 parts of methanol containing 0.5 parts of hydroquinone monomethyl ether. (The ratio of methanol to polymer is 1.7.) The solution did not become substantially uniform even after 7 days.

C: (Test Run 3)

Sample C was added to a saturated aqueous solution of calcium chloride containing 2.0 parts of hydroquinone, so as to coagulate the emulsion. The separated polyvinyl acetate was washed repeatedly with cold water and warm water to remove unreacted vinyl acetate monomer. The polyvinyl acetate was dried with hot air at 50° C. for 24 hours. The polyvinyl acetate in the form of cut small pieces was dissolved with stirring in 600 parts of methanol at 40° C. It took about 72 hours for the polyvinyl acetate to dissolve in methanol completely.

Meanwhile, Sample A was saponified at a polymer concentration of 5%, at an [NaOH]/[VAc] molar ratio of 0.1, and at 40° C.; and Sample C was saponified at a polymer concentration of 5%, at an [NaOH]/[VAc] molar ratio of 0.05, and at 40° C. In both cases, there was obtained colorless PVA. The PVA was washed with methanol using a Soxhlet apparatus and the degree of saponification of the washed PVA was measured. It was 98.5% for Sample A and 99.1% for Sample C. 0.1 Parts each of Sample A and Sample C was reacetylated in a mixture composed of 8 parts of acetic anhydride and 2 parts of pyridine with occasional stirring at 105° C. for 20 hours. The resulting polyvinyl acetate was purified by repeated precipitation with ether from an acetone solution and with water from an acetone solution. The intrinsic viscosity of the purified polyvinyl acetate was measured in acetone at 30° C.; $[\eta]=3.67$ (dl/g) in the case of Sample A, and $[\eta]=3.61$ (dl/g) in the case of Sample C.

Example 10

In a reactor equipped with a stirrer, thermometer, nitrogen inlet, and cooling pipe was placed 300 parts of deionized water, 300 parts of vinyl acetate, 100 parts of methanol, 9 parts of polyoxyethylene [POE(50)] nonylphenylether ("Nonipol 500", a product of Sanyo Chemical Industries, Ltd.), 0.02 parts of FeSO$_4$.7H$_2$O, 0.50 parts of Rongalite, and 0.007 parts of 2-mercaptoethanol. This mixture was boiled for 30 minutes and then cooled to room temperature while introducing nitrogen.

Then the internal temperature was lowered to −20° C. under a nitrogen stream, and the polymerization was initiated by continuously adding 0.004% hydrogen peroxide at a rate of 7 parts per hour. (The hydrogen peroxide solution was separately prepared from deaerated deionized water.) During polymerization, 0.15% 2-mercaptoethanol was continuously added at a rate of 4.5 parts per hour. (The 2-mercaptoethanol solution was separately prepared from deaerated solution (deionized water/methanol=1/1)). During polymerization, the system was sealed with nitrogen gas to prevent the entrance of oxygen. Four hours later when the conversion to polymer reached 60% (the maximum rate of polymerization=20%/hr), the emulsion (having an average particle diameter of 0.15 μm) in the reactor was dissolved with stirring in 2000 parts of methanol containing 0.5 parts of hydroquinone monomethyl ether.

After dissolution, unreacted vinyl monomer was removed while adding methanol under reduced pressure. Thus there was obtained a methanol solution of polyvinyl acetate. A portion of the solution was saponified at a PVAc concentration of 6%, at an [NaOH]/[VAc] molar ratio of 0.1, and at 40° C. 0.1 Parts of the resulting polyvinyl alcohol (PVA) was reacetylated with occasional stirring in a mixed liquid composed of 8 parts of acetic anhydride and 2 parts of pyridine at 105° C. for 20 hours. The resulting polyvinyl acetate was purified by repeated reprecipitation with ether from an acetone solution and with water from an acetone solution. The intrinsic viscosity of the purified polyvinyl acetate was measured in acetone at 30° C. according to the dilution method using an Ubbellohde viscometer; $[\eta]=2.25$ (dl/g).

The methanol solution of polyvinyl acetate was saponified at a PVAc concentration of 6%, at an [NaOH]/[VAc] molar ratio of 0.1, and at 40° C. After removal of solution, the resulting PVA was immersed in methanol containing the same amount of NaOH as used for saponification. Resaponification was performed at 40° C. for 24 hours. The residual NaOH in PVA was neutralized with 1N sulfuric acid and the resulting PVA was washed with 0.0001N sulfuric acid and then washed repeatedly with deionized water and finally washed with methanol. After removal of methanol the purified PVA was dried at 60° C. The purified PVA was found to have a degree of saponification of 99.8%. This PVA was reacetylated under the same conditions as mentioned above and the resulting polyvinyl acetate was purified by reprecipitation in the same manner as mentioned above. The intrinsic viscosity of the purified polyvinyl acetate was measured in acetone at 30° C.; $[\eta]=2.25$ (dl/g).

The content of 1,2-glycol bondage of the purified polyvinyl alcohol was measured by NMR. It was 0.79 mol %.

Examples 11 to 13

The procedure in EXAMPLE 10 was repeated except that the conditions of polymerization were modified as shown in Table 2-(a). The results are shown in Table 2-(b).

TABLE 2-(a)

| | | | | Polymerization Conditions | | | | |
|---|---|---|---|---|---|---|---|---|
| Example | Water (Parts) | MeOH (Parts) | 2-mercapto ethanol (parts) | Emulsifier (parts) | Initiator (%, parts) (E) | (F) | (G) | Temperature (°C.) |
| 11 | 300 | 100 | 0.144 | Polyoxyethylene [POE(50)] nonylphenyl ether  9 | $H_2O_2$ 0.023% | $FeSO_4.7H_2O$ 0.04 parts | Rongalite 1.0 parts | −20 |
| 12 | 280 | 120 | 0.125 | Polyoxyethylene [POE(40)] nonylphenyl ether  12 | $H_2O_2$ 0.023% | $FeSO_4.7H_2O$ 0.04 parts | Rongalite 1.0 parts | −30 |
| 13 | 300 | 0 | 0.075 | Polyoxyethylene [POE(50)] nonylphenyl ether  12 | $H_2O_2$ 0.023% | $FeSO_4.7H_2O$ 0.02 parts | Rongalite 0.5 parts | 5 |

TABLE 2-(b)

| | | | Results of Polymerization | | | | | |
|---|---|---|---|---|---|---|---|---|
| | Polymerization time | Conversion to polymer | Maximum rate of polymerization | Polyvinyl ester | Average particle diameter of | Polyvinyl alcohol | | |
| Example | (Parts) | (%) | (%/hr) | $[\eta]$ (dl/g) | polyvinyl ester (μm) | $[\eta]$ (dl/g) | (mol %)*1 | (mol %)*2 |
| 11 | 2.8 | 65 | 19 | 1.60 | 0.13 | 1.60 | 99.9 | 0.79 |
| 12 | 4.0 | 55 | 15 | 1.73 | 0.15 | 1.73 | 99.9 | 0.70 |
| 13 | 3.8 | 62 | 18 | 1.89 | 0.12 | 1.89 | 99.9 | 1.05 |

*1 Degree of saponification.
*2 Content of 1,2-glycol bonding.

Comparative Example 3

In a reactor equipped with a stirrer, thermometer, nitrogen inlet, and cooling pipe was placed 278 parts of deionized water and 120 parts of vinyl acetate. This mixture was boiled for 30 minutes and then cooled to room temperature while introducing nitrogen.

Then 2 parts of a 35% aqueous solution of stearamido-propyldimethyl-$\beta$-hydroxyethyl ammonium dihydrogen phosphate was added to the reactor. Then the internal temperature was lowered to 5° C. under a nitrogen stream. The reaction mixture was then irradiated for 7 hours at this temperature by gamma radiation produced by a Co60 source at a dose rate of 2900 r./hr. (Total dose=$2.03 \times 10^{14}$ r.)

During polymerization, the system was sealed with nitrogen gas to prevent the entrance of oxygen. 7 Hours later when the conversion to polymer reached 85%, the emulsion in the reactor was slowly added with stirring in 700 parts of methanol containing 0.2 parts of hydroquinone monomethyl ether. The solution did not become substantially uniform even after 3 days.

A dissolved portion of polyvinyl acetate was saponified in the same manner as in Example 1 to give PVA. The PVA was reacetylated to give polyvinyl acetate. The intrinsic viscosity of the reacetylated polyvinyl acetate was measured; $[\eta]=2.95$ (dl/g). The content of 1,2-glycol bondage of the purified polyvinyl alcohol was measured by NMR. It was 1.06 mol %.

Comparative Example 4

Following the procedure used in Comparative Example 3 and the same proportions of reactants polyvinyl acetate was produced by irradiating the reaction mixture with gamma radiation at a dose rate of 2900 r./hr. for 6.5 hours at 5° C. The total dose of radiation was $1.88 \times 10^4$ r. Conversion to polymers of 55% were obtained. The emulsion in the reactor was slowly added in the same manner as in Comparative Example 3. The solution did not become substantially uniform even after 1 day.

The polymer obtained as aforesaid was saponified and reacetylated by the method for Example 1. The intrinsic viscosity of the reacetylated polyvinyl acetate was measured; $[\eta]=3.10$ (dl/g).

The content of 1,2-glycol bondage of the purified polyvinyl alcohol was measured. It was 1.05 mol %.

We claim:

1. A process for producing a vinyl ester polymer having a high degree of polymerization and an intrinsic viscosity of from 1.5 dl g$^{-1}$ to 3.2 dl g$^{-1}$, said process comprising:

(1) subjecting a vinyl ester monomer to emulsion polymerization under conditions (a), (b), (c), and (d);

wherein:

(a) said emulsion polymerization is carried out in a medium which is water or a mixture of water and at least one member selected from the group consisting of water-soluble alcohols, water-soluble glycols, water-soluble glycerins, and water-soluble inorganic salts;

(b) said emulsion polymerization is carried out in the presence of an emulsifier which is at least one member selected from the group consisting of nonionic emulsifiers, nonionic-anionic emulsifiers, and anionic emulsifiers;

(c) said emulsion polymerization is carried out in the presence of an initiator which is (c1) a combination of at least one member selected from the group consisting of hydroperoxides, peroxides, and peracid esters, and at least one member selected from the group consisting of metal ions capable of transferring one electron, or wherein said initiator is (c2) a combination of at least one member selected from the group consisting of hydroperoxides, peroxides, and peracid esters, at least one member selected from the group consisting of metal ions capable of transferring one electron, and at least one member selected from the group consisting of reducing substances;

(d) said emulsion polymerization is carried out at a polymerization temperature of from −60° C. and up to +15° C.; and (2) obtaining a vinyl ester polymer having a high degree of polymerization and an intrinsic viscosity of from 1.5 dl g$^{-1}$ to 3.2 dl g$^{-1}$ as measured in acetone at 30° C. for a vinyl ester polymer sample obtained by saponification, followed by reacetylation, of said vinyl ester polymer.

2. The process of claim 1, wherein said vinyl ester monomer is vinyl acetate.

3. The process of claim 1, wherein said emulsion polymerization medium is a 100/0 to 50/50 weight ratio mixture of water and at least one member selected from the group consisting of water-soluble alcohols, water-soluble glycols, water-soluble glycerins, and water-soluble inorganic salts.

4. The process of claim 3, wherein said weight ratio is 90/10 to 60/40.

5. The process of claim 1, wherein said emulsifier is present in an amount of from 0.5 to 50 wt. % relative to the weight of said vinyl ester monomer.

6. The process of claim 5, wherein said emulsifier is used in an amount of from 1 to 30 wt. % relative to the weight of said vinyl ester monomer.

7. The process of claim 1, wherein said emulsifier is a nonionic emulsifer.

8. The process of claim 1, wherein said water-soluble alcohol is methanol.

9. A vinyl ester polymer having a high degree of polymerization and an intrinsic viscosity of from 1.5 dl $g^{-1}$ to 3.2 dl $g^{-1}$, said vinyl ester polymer being obtained by a process which comprises subjecting a vinyl ester monomer to emulsion polymerization under conditions (a), (b), (c), and (d);

wherein:

(a) said emulsion polymerization is carried out in a medium which is water or a mixture of water and at least one member selected from the group consisting of water-soluble alcohols, water-soluble glycols, water-soluble glycerins, and water-soluble inorganic salts;

(b) said emulsion polymerization is carried out in the presence of an emulsifier which is at least one member selected from the group consisting of nonionic emulsifiers, nonionic-anionic emulsifiers, and anionic emulsifiers;

(c) said emulsion polymerization is carried out in the presence of an initiator which is (c1) a combination of at least one member selected from the group consisting of hydroperoxides, peroxides, and peracid esters, and at least one member selected from the group consisting of metal ions capable of transferring one electron, or said initiator is (c2) a combination of at least one member selected from the group consisting of hydroperoxides, peroxides, and peracid esters, at least one member selected from the group consisting of metal ions capable of transferring one electron, and at least one member selected from the group consisting of reducing substances;

(d) said emulsion polymerization is carried out at a polymerization temperature of from $-60°$ C. and up to $+15°$ C.; and obtaining a vinyl ester polymer having a high degree of polymerization and an intrinsic viscosity of from 1.5 dl $g^{-1}$ to 3.2 dl $g^{-1}$, said intrinsic viscosity being defined as the intrinsic viscosity, as measured in acetone at 30° C., of a vinyl ester polymer sample obtained by saponification, followed by reacetylation, of said vinyl ester polymer.

10. The vinyl ester polymer of claim 9, wherein said vinyl ester monomer is vinyl acetate.

11. The vinyl ester polymer of claim 9, wherein said medium is a 100/0 to 50/50 weight ratio mixture made up of water and at least one member selected from the group consisting of water-soluble alcohols, water-soluble glycols, water-soluble glycerins, and water-soluble inorganic salts.

12. The vinyl ester polymer of claim 11, wherein said medium is a 90/10 to 60/40 weight ratio mixture of water and at least one member selected from the group consisting of water-soluble alcohols, water-soluble glycols, water-soluble glycerins, and water-soluble inorganic salts.

13. The vinyl ester polymer of claim 9, wherein said emulsifier is used in an amount of from 0.5 to 50 wt. % relative to the vinyl ester monomer.

14. The vinyl ester polymer of claim 13, wherein said emulsifier is used in an amount of from 1 to 30 wt. % relative to said vinyl ester monomer.

15. The vinyl ester polymer product of claim 9, wherein said emulsifier is a nonionic emulsifier.

16. The vinyl ester polymer of claim 9, wherein said water-soluble alcohol is methanol.

* * * * *